(12) United States Patent
Kihara et al.

(10) Patent No.: US 11,543,848 B2
(45) Date of Patent: Jan. 3, 2023

(54) ACCELERATOR DEVICE

(71) Applicant: DENSO CORPORATION, Kariya (JP)

(72) Inventors: Noriyasu Kihara, Kariya (JP);
Haruhiko Suzuki, Kariya (JP);
Yasuhiro Ootaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/338,256

(22) Filed: Jun. 3, 2021

(65) Prior Publication Data

US 2021/0294371 A1 Sep. 23, 2021

Related U.S. Application Data

(63) Continuation of application No. PCT/JP2019/040260, filed on Oct. 11, 2019.

(30) Foreign Application Priority Data

Dec. 20, 2018 (JP) .............................. JP2018-237831

(51) Int. Cl.
| | |
|---|---|
| *G05G 25/04* | (2006.01) |
| *B60K 26/02* | (2006.01) |
| *G05G 1/44* | (2008.04) |
| *G05G 5/05* | (2006.01) |
| *G05G 25/02* | (2006.01) |

(52) U.S. Cl.
CPC ............. *G05G 25/04* (2013.01); *B60K 26/02* (2013.01); *G05G 1/44* (2013.01); *G05G 5/05* (2013.01); *G05G 25/02* (2013.01); *G05G 2505/00* (2013.01)

(58) Field of Classification Search
CPC ........................... G05G 25/02; G05G 2505/00
See application file for complete search history.

(56) References Cited

U.S. PATENT DOCUMENTS

| | | | |
|---|---|---|---|
| 2007/0151398 A1* | 7/2007 | Kim ..................... | G05G 1/483 |
| | | | 74/513 |
| 2018/0135726 A1* | 5/2018 | Kita ..................... | F16F 15/085 |

FOREIGN PATENT DOCUMENTS

| | | |
|---|---|---|
| EP | 1 777 095 | 4/2007 |
| JP | 49-139733 | 12/1974 |
| JP | 2018-75912 | 5/2018 |
| WO | 2020/129388 | 6/2020 |

OTHER PUBLICATIONS

Tomohiro Sakuraba, et al., "Development of Plastic Organ-type Accelerator Pedal Assembly", Honda R&D Technical Review, vol. 15, No. 2, Oct. 1, 2003, pp. 189-194 (8 pages).

* cited by examiner

*Primary Examiner* — Vicky A Johnson
(74) *Attorney, Agent, or Firm* — Nixon & Vanderhye P.C.

(57) ABSTRACT

An accelerator device having an organ structure includes a pad, a case, an inside movable mechanism, an arm, and a cover. The pad is pressed by a driver. The case is attachable to a vehicle body and includes a front wall, a rear wall, and an opened side. The inside movable mechanism is housed in the case and includes a shaft, a pedal, and a bias member. The arm penetrates an opening of the case so as to connect the pad to the pedal. The cover covers the opened side. The case on the vehicle body includes a drain passage positioned below a lowest position of a root of the pedal in a movement track while the pedal is moved from an accelerator idle state to an accelerator full-throttle state.

17 Claims, 14 Drawing Sheets

A VIEW

A VIEW

A VIEW

ACCELERATOR DEVICE

CROSS REFERENCE TO RELATED APPLICATION

The present application is a continuation application of International Patent Application No. PCT/JP2019/040260 filed on Oct. 11, 2019, which designated the U.S. and claims the benefit of priority from Japanese Patent Applications No. 2018-237831 filed on Dec. 20, 2018. The entire disclosures of all of the above applications are incorporated herein by reference.

TECHNICAL FIELD

The present disclosure relates to an accelerator device of a vehicle.

BACKGROUND

A known accelerator device which has a structure of an organ type is fixed to a floor of a vehicle body in a vehicle interior.

SUMMARY

According to one aspect of the present disclosure, an accelerator device having an organ structure is provided. The accelerator device includes a pad, a case, an inside movable mechanism, an arm, and a cover. The pad is configured to be pressed by a driver. The case is configured to be attached to a vehicle body and includes: a front wall facing the pad; a rear wall opposed to the front wall; and an opened side located so as to form one of side surfaces of a space between the front wall and the rear wall. The inside movable mechanism is housed in the case and includes: a shaft supported by the case and configured to rotate; a pedal that extends obliquely upward from an outer peripheral surface of the shaft; and a bias member arranged below the pedal and configured to bias the pedal toward a direction in which an accelerator throttle is fully closed. The arm penetrates an opening provided in the front wall of the case so as to connect the pad to the pedal. The cover covers the opened side. The case includes at least one drain passage arranged below a lowest position of a root of the pedal in a movement track while the pedal is moved from an idle state to a full-throttle state, as the accelerator device is provided on the vehicle body.

DETAILED DESCRIPTION

An accelerator which has a structure of an organ type may be fixed to a floor of a vehicle body in a vehicle interior and detect a depression amount of an accelerator pedal pressed by a driver.

Water may enter a vehicle interior and an accelerator, for example, when a vehicle is washed. In the above accelerator, countermeasures against ingress of water is not considered. Because of this, if water enters the accelerator, adverse effect such as deterioration in operational feeling of the accelerator or generation of abnormal noise may be caused. Therefore, the adverse effect due to the ingress of water into the accelerator is preferred to be reduced.

According to an exemplar embodiment of the present disclosure, an accelerator device having an organ structure is provided. The accelerator device includes a pad, a case, an inside movable mechanism, an arm, and a cover. The pad is configured to be pressed by a driver. The case is configured to be attached to a vehicle body and includes: a front wall facing the pad; a rear wall opposed to the front wall; and an opened side located so as to form one of side surfaces of a space between the front wall and the rear wall. The inside movable mechanism is housed in the case and includes: a shaft supported by the case and configured to rotate; a pedal that extends obliquely upward from an outer peripheral surface of the shaft; and a bias member arranged below the pedal and configured to bias the pedal toward a direction in which an accelerator throttle is fully closed. The arm penetrates an opening provided in the front wall of the case so as to connect the pad to the pedal. The cover covers the opened side. The case includes at least one drain passage arranged below a lowest position of a root of the pedal in a movement track while the pedal is moved from an idle state to a full-throttle state, as the accelerator device is provided on the vehicle body.

In the accelerator device, when water enters the case from the opening in the front wall of the case, the water can be discharged so as to be restricted from being accumulated above or at the lowest position in the movement track of the root of the pedal. Therefore, adverse effect such as deterioration in operational feeling due to resistance of the water to operation of the pedal or generation of abnormal noise can be reduced.

Figure 1:
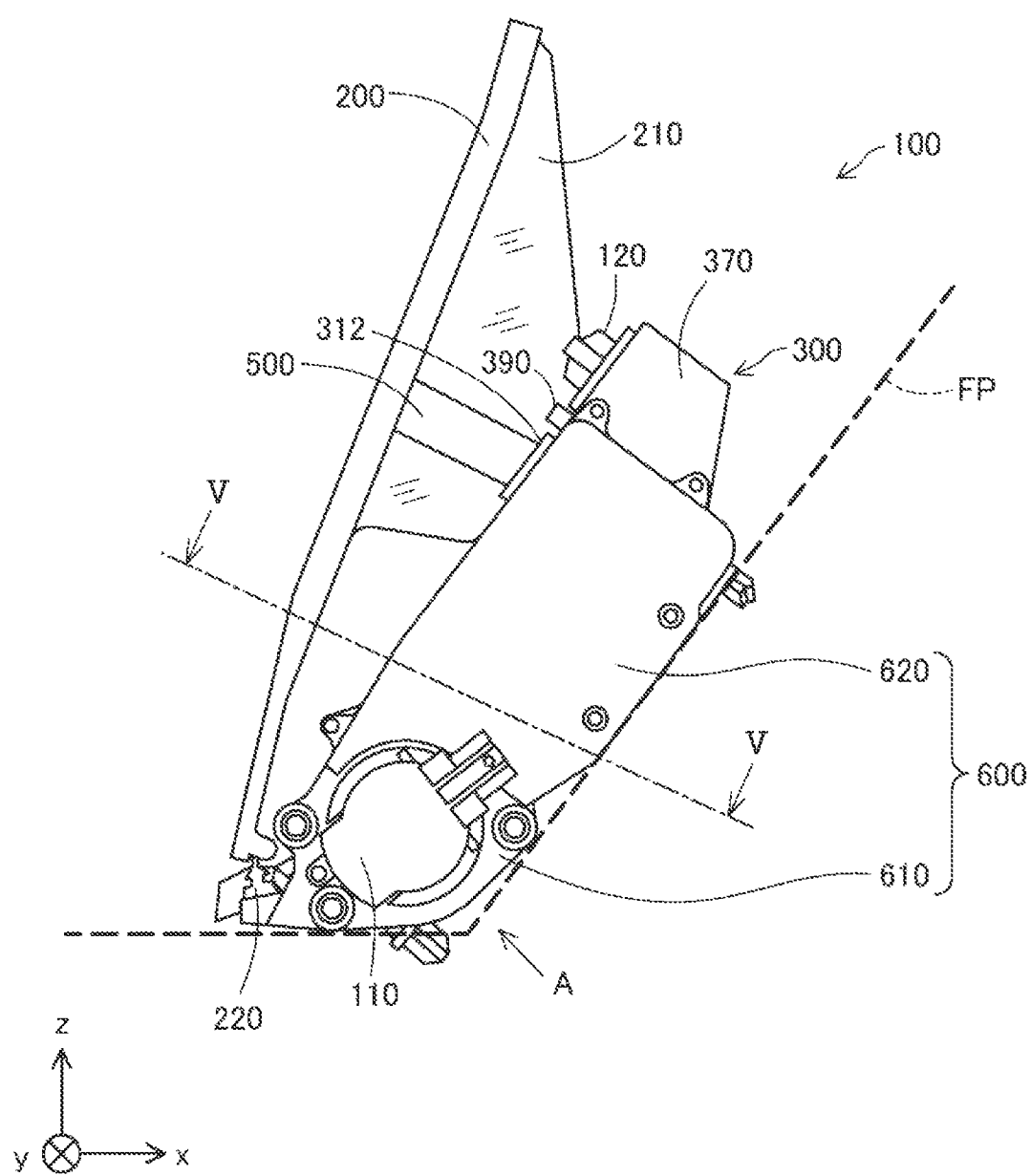
FIG. 1 is a side view illustrating an accelerator according to an embodiment.
Figure 2:
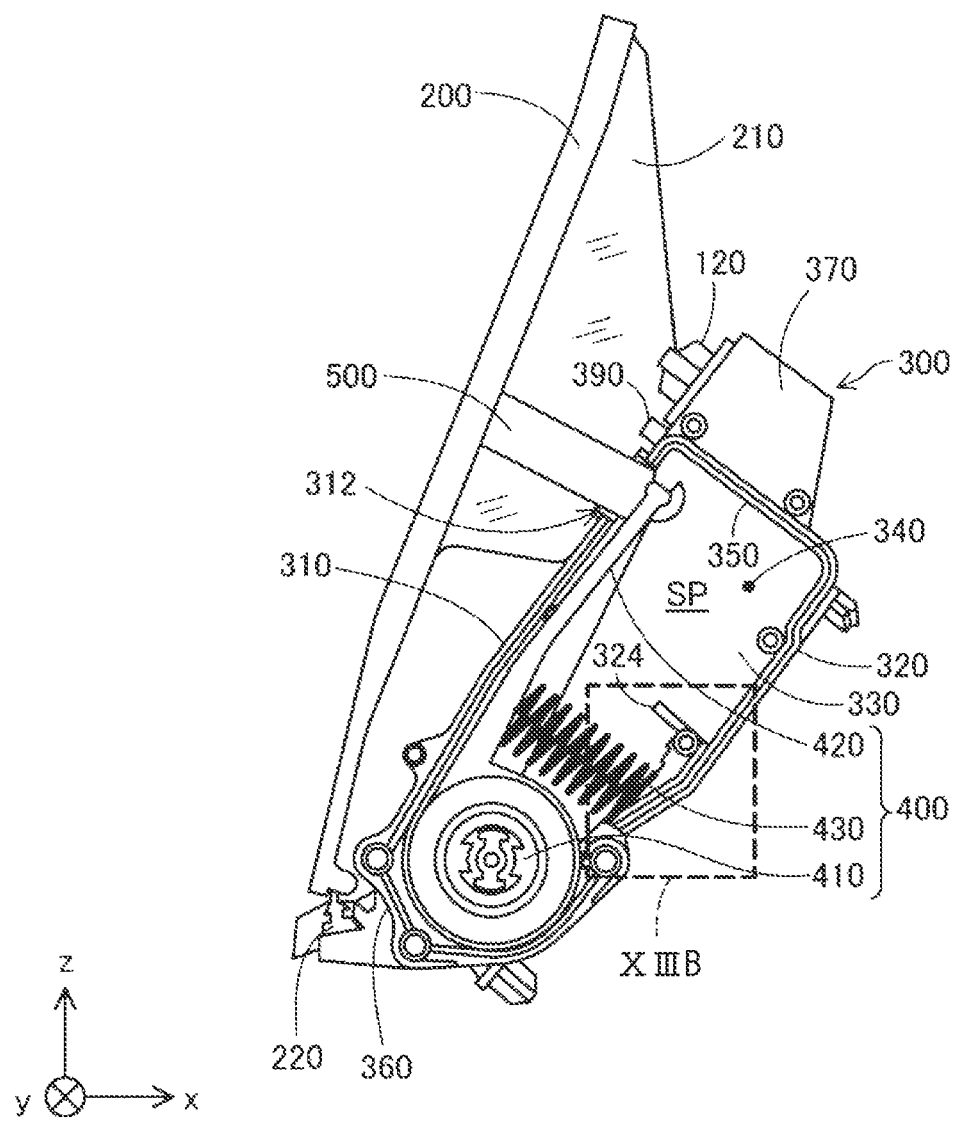
FIG. 2 is a side view of the accelerator without a cover.
Figure 3:
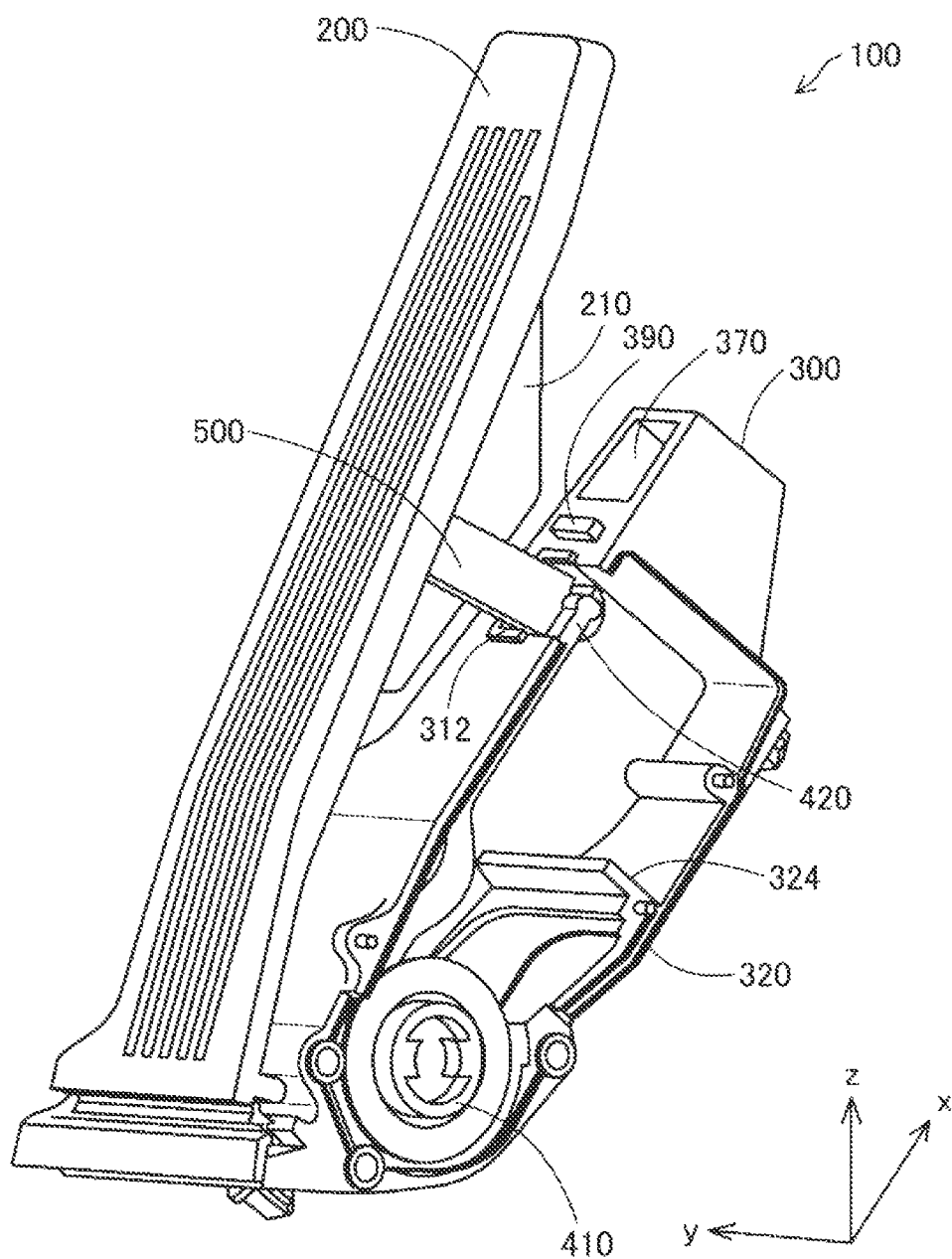
FIG. 3 is a perspective view of the accelerator without the cover.

A. Overall Structure of Accelerator:

As shown in FIGS. 1 to 3, an accelerator 100 is attachable to a floor panel FP included in a vehicle body of a vehicle. In FIG. 1, x-axis direction coincides with a direction in which the vehicle moves, y-axis direction coincides with a width direction of the vehicle, and z-axis direction coincides with a vertical direction upward. In other drawings which will be described below, x-axis direction, y-axis direction, and z-axis direction are same as those shown in FIG. 1 respectively. Unless otherwise stated, structure or arrangement of the accelerator 100 in a situation that is installed in the vehicle body will be described below. For example, "upward" or "above" means that upward or above in a situation that the accelerator 100 is installed in the vehicle body. Other terms and descriptions are same as above.

The accelerator 100 includes a pad 200, a case 300, an inside movable mechanism 400, and an arm 500. The pad 200 is configured to be pressed by a driver. The case 300 can be attached to the vehicle body. The inside movable mechanism 400 is housed in the case 300. The arm 500 penetrates an opening 312 provided in an outer wall of the case 300 and connects the pad 200 to the inside movable mechanism 400. The opening 312 may be referred to as through hole 312. As described above, in the accelerator 100, the arm 500 connects the pad 200 arranged between the driver and the case 300 to the inside movable mechanism 400 housed in the case 300. The accelerator structured as above is referred to as an organ type accelerator.

The pad 200 is configured to be pressed by the driver. A side guard 210 has a plate shape and is provided on a side surface of the pad 200. A lower end of the pad 200 is supported by a fulcrum member 220 provided on a lower end of the case 300. The pad 200 is configured to turn about a contact point with the fulcrum member 220. The side guard 210 closes a gap between the pad 200 and the case 300 so as to protect the foot of the driver from getting caught between the pad 200 and the case 300.

As shown in FIG. 2, the case 300 includes a front wall 310, a rear wall 320, an opened side 330, a side wall 340, a top wall 350, and a bottom wall 360, as walls which surround an internal housing space SP. The front wall 310 faces the pad 200. The rear wall 320 is opposed to the front wall 310. The opened side 330 forms one of side surfaces of a space between the front wall 310 and the rear wall 320. The side wall 340 is opposed to the opened side 330. The top wall 350 is an upper end of the internal housing space SP. The bottom wall 360 is opposed to the top wall 350. As the opened side 330 is not a wall, the front wall 310, the rear wall 320, the side wall 340, the top wall 350, and the bottom wall 360, except for the opened side 330, exactly function as housing walls which surround the internal housing space SP. As shown in FIG. 1, the opened side 330 is covered and closed by a cover 600. The cover 600 includes a first cover 610 and a second cover 620. In the present embodiment, the first cover 610 and the second cover 620 are separately structured. However, the first cover 610 and the second cover 620 may be combined.

In the case 300, an opening 312 and a full open stopper 390 are provided in the outer wall facing the pad 200. The arm 500 passes through the opening 312. The full open stopper 390 is configured to regulate an accelerator fully open position by being brought into contact with the pad 200 when the pad 200 is fully pressed. The accelerator fully open position is a position at which an accelerator throttle opening is 100%. A kick-down switch 120 is arranged on an outer wall of the case 300 above the full open stopper 390. The kick-down switch 120 is configured to detect a kick-down. The kick-down is a movement to change to a lower gear at once by the driver pressing the pad 200 strongly. A housing chamber 370 is formed at a top of the case 300 and houses the kick-down switch 120. In FIG. 3, the kick-down switch 120 is removed from the housing chamber 370.

As shown in FIG. 2, a screen 324 is arranged on an inner surface of the rear wall 320 in the case 300 and extends obliquely upward from the rear wall 320 toward the front wall 310. When water enters the case 300 from the opening 312, the screen 324 is configured to guide the water to flow through a route avoiding a bias member 430. That is, if the water falls in a vertical direction, the screen 324 restricts the water from directly reaching the bias member 430.

As shown in FIG. 2, the inside movable mechanism 400 includes a shaft 410, a pedal 420, and the bias member 430. The shaft 410 is supported by the case 300 and configured to rotate. The pedal 420 extends obliquely upward from an outer peripheral surface of the shaft 410. The bias member 430 is arranged below the pedal 420 and configured to bias the pedal toward a direction in which the accelerator 100 sets a throttle fully closed state. As shown in FIG. 1, the first cover 610 covers a lower portion of the opened side 330 in the case 300 corresponding to a side of the shaft 410. The second cover 620 covers an upper portion of the opened side 330 above the first cover 610.

As shown in FIG. 1, an accelerator opening sensor 110 is arranged outside the shaft 410 and configured to generate an accelerator opening signal corresponding to a rotation angle of the shaft 410. In the present embodiment, the accelerator opening sensor 110 includes a detection circuit which includes a Hall element detecting an orientation of a permanent magnet embedded in the shaft 410. However, various types of the accelerator opening sensor other than that explained above are applicable.

Figure 4:
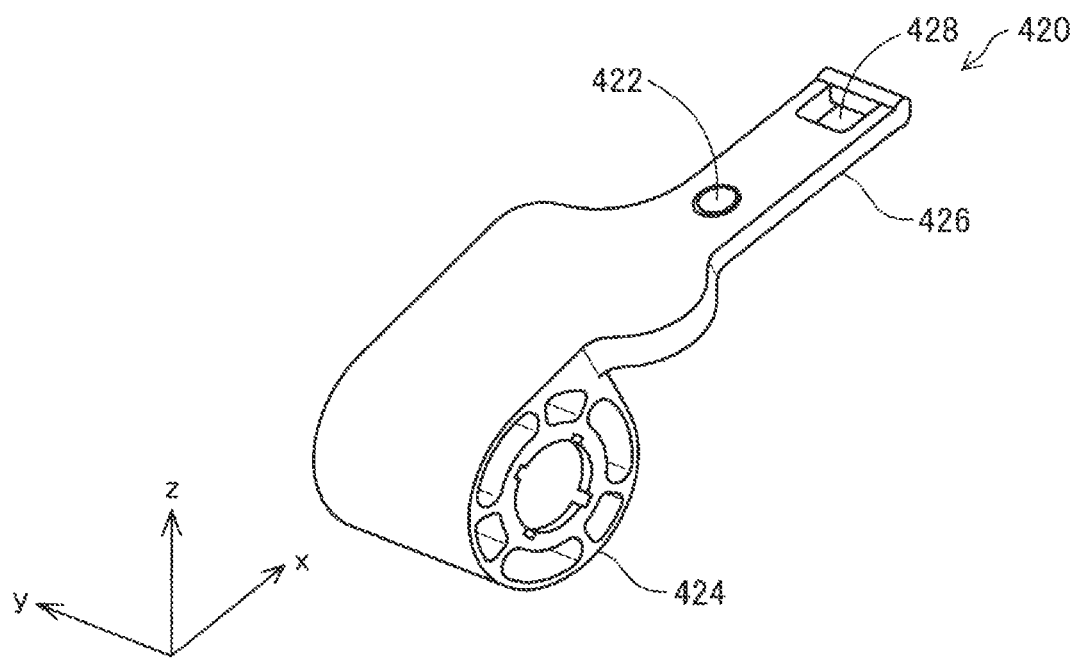
FIG. 4 is a perspective view of a pedal.

As shown in FIG. 4, the pedal 420 includes a cylinder 424 and a pedal extension part 426. The shaft 410 is inserted into the cylinder 424. The pedal extension part 426 extends obliquely upward from the cylinder 424. A position on which the pedal extension part 426 branches from the cylinder 424 is referred to as root of the pedal 420. An engagement hole 428 is provided around an end of the pedal extension part 426 and is engaged with an end of the arm 500. A fully close stopper 422 is provided on an upper surface of the pedal extension part 426 and protrudes from the upper surface of the pedal extension part 426. The fully close stopper 422 is configured to regulate a position of the accelerator in the fully closed state by being brought into contact with an inner surface of the front wall 310 of the case 300.

Figure 5:
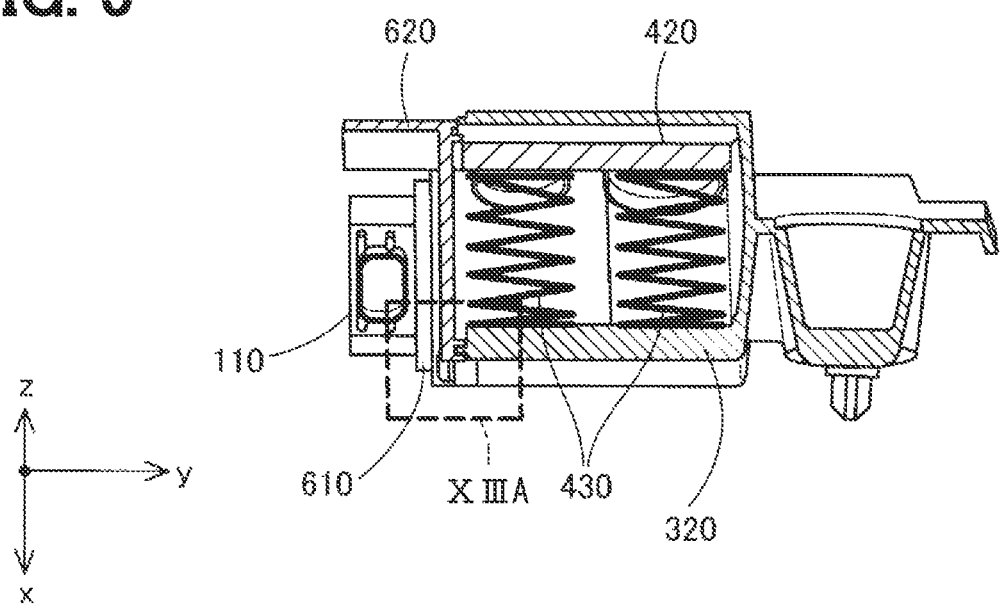
FIG. 5 is a cross sectional view taken along a line V-V in FIG. 1.

FIG. 5 is a cross sectional view taken along a line V-V in FIG. 1. As shown in FIG. 5, two bias members 430 are provided below the pedal 420. In the present embodiment, the bias member 430 is a helical spring. However, the bias member 430 may be structured differently.

Components of the accelerator 100 except for the shaft 410 and a spring of the bias member 430 may be made of resin. An overall structure of the accelerator 100 described above is one example and a part of them may be arbitrarily omitted. For example, the side guard 210 or the screen 324 may be omitted.

Figure 6:
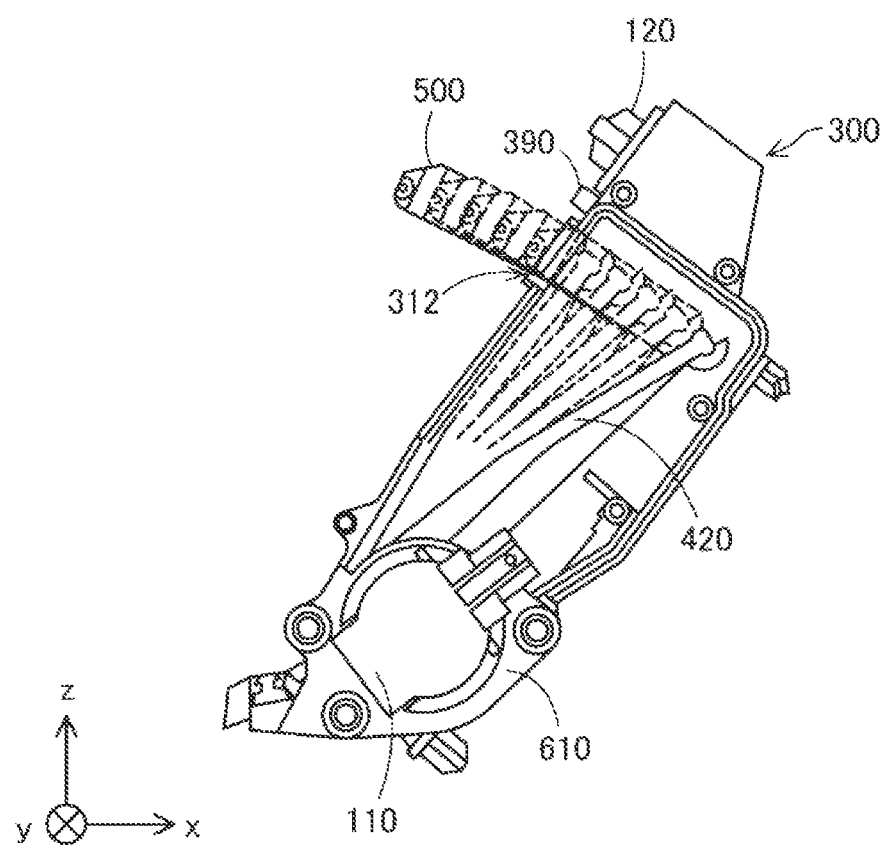
FIG. 6 is an explanatory view showing a track of the pedal being moved from a fully closed state of the accelerator to a fully open state of the accelerator.
Figure 7:
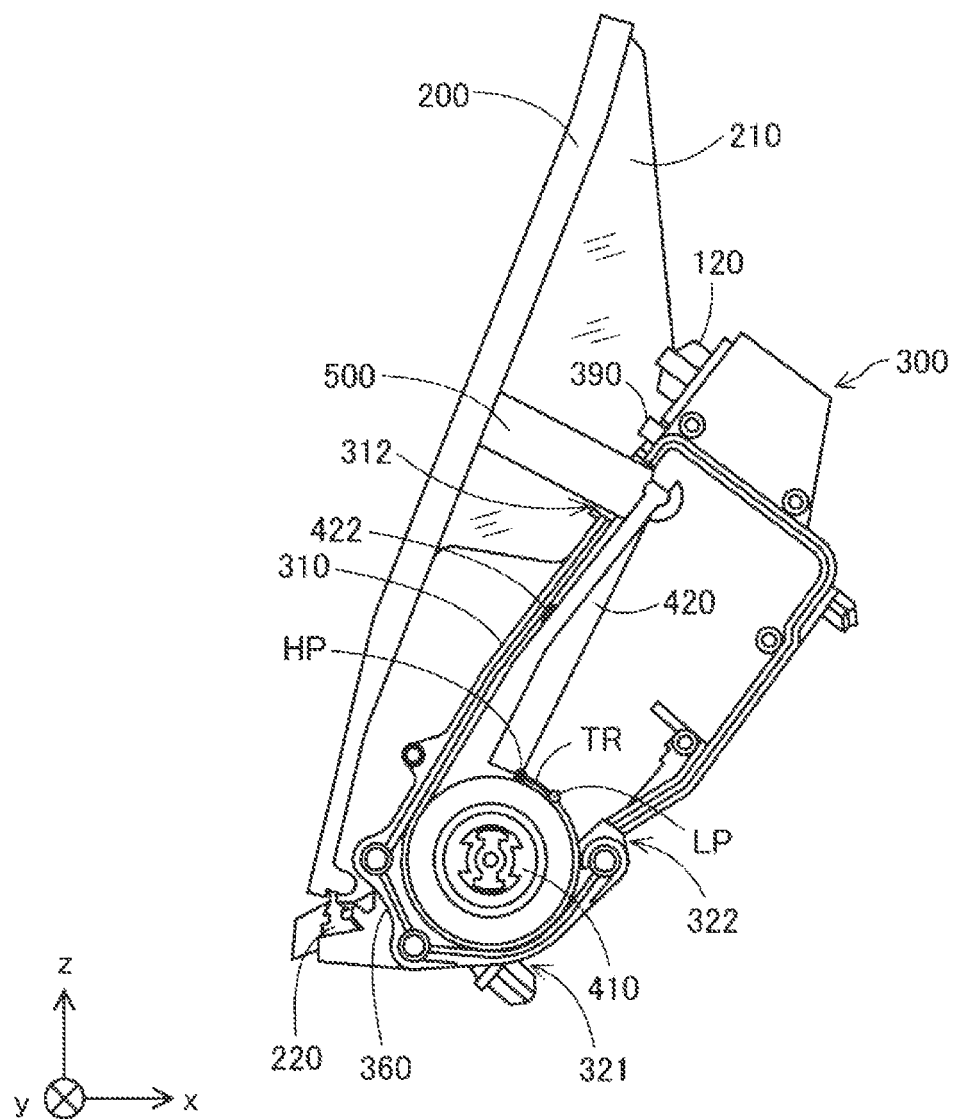
FIG. 7 is a side view of the accelerator in the fully closed state.
Figure 8:
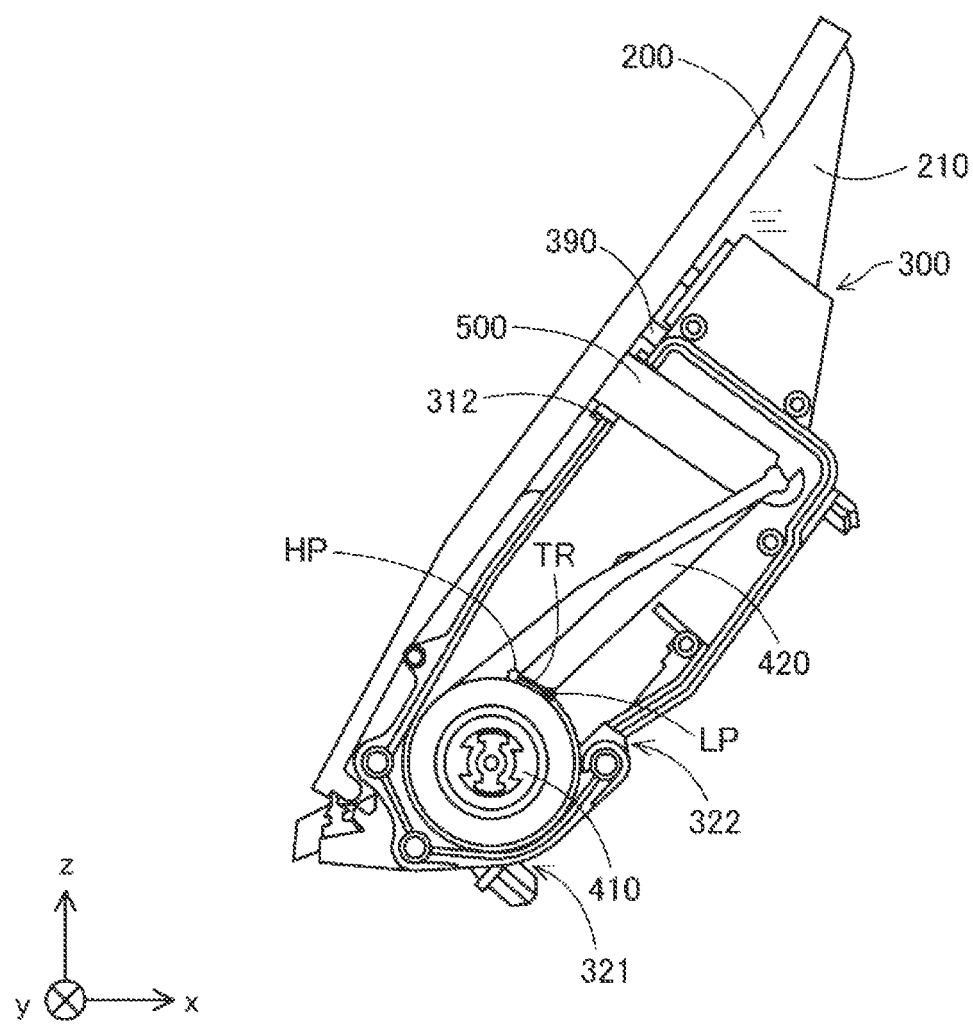
FIG. 8 is a side view of the accelerator in the fully open state.

As shown in FIG. 6, as the accelerator 100 is changed from the fully closed state to the fully open state, positions of the arm 500 and the pedal 420 are changed accordingly. For example, in the accelerator 100 in the fully closed state as shown in FIG. 7, the root of the pedal 420 is positioned at a highest position HP in a movement track TR. On the other hand, in the accelerator 100 in the fully open state as shown in FIG. 8, the root of the pedal 420 is positioned at a lowest position LP in the movement track TR. In other words, a position of the root of the pedal 420 is changed between the highest position HP and the lowest position LP along the movement track TR. If the water enters the case 300 through the opening 312 and is accumulated over the lowest position LP in the movement track TR of the root of the pedal 420, adverse effect such as deterioration in operational feeling due to water resistance to operation of the pedal 420 or generation of abnormal noise may be caused. Therefore, in the present embodiment, as described below, at least one drain passage 321, 322 is arranged below the lowest position LP in the movement track TR of the root of the pedal 420. The drain passage 321, 322 connects an inside of the case 300 to an outside of the case 300. The bias member 430 is omitted in FIGS. 7 and 8.

Figure 9A:
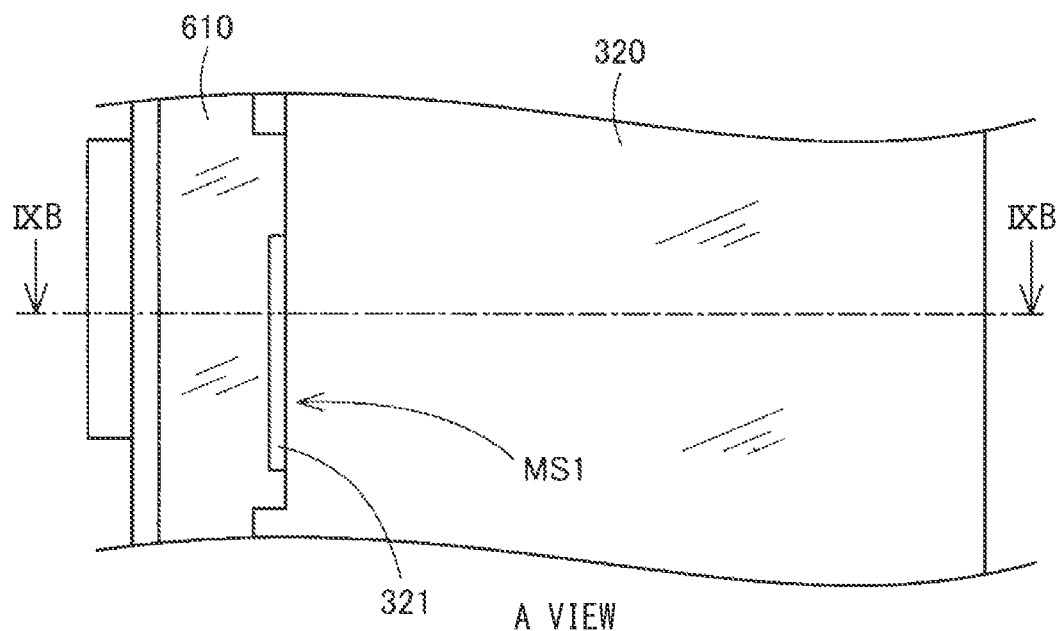
FIG. 9A shows a first structural example of a first drain passage viewed along an arrow A in FIG. 1.
Figure 9B:
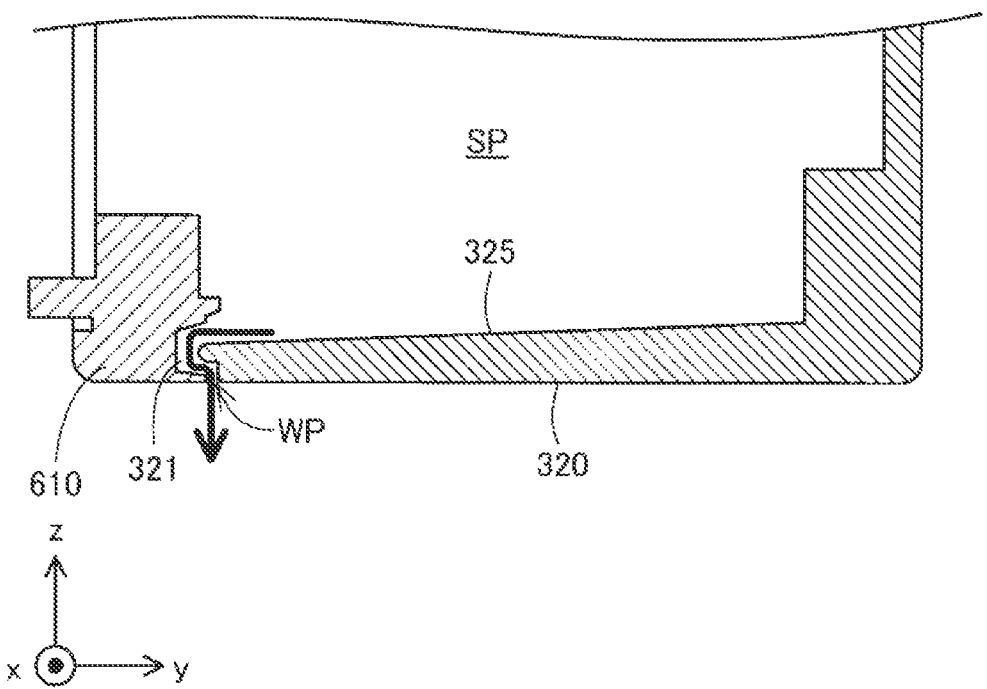
FIG. 9B is a cross sectional view taken along a line IXB-IXB in FIG. 9A.

B. Structural Example of First Drain Passage:

As shown in FIG. 9A viewed along an arrow A in FIG. 1, a first drain passage 321 is formed by a first combined portion MS1 between the case 300 and the first cover 610 which are overlapped with each other through a gap. The first drain passage 321 connects the inside of the case 300 to the outside of the case 300. Water entering from the opening 312 of the case 300 can be discharged through the first drain passage 321 toward the outside of the case 300. FIG. 9B is a cross sectional view taken along a line IXB-IXB in FIG. 9A. As shown in FIG. 9B, the first drain passage 321 has a labyrinth structure such that the inside of the case 300 is not directly visible from the outside of the case 300. More specifically, a recess is formed on a lower part of the first cover 610, and an end part of the rear wall 320 of the case 300 is inserted halfway into the recess of the first cover 610. Accordingly, the first drain passage 321 is formed in a bending shape. Water WP is discharged from the inside of the case 300 to the outside of the case 300 through the first drain passage 321.

The first drain passage 321 is arranged below the lowest position LP in the movement track TR of the root of the pedal 420 as shown in FIG. 8. Accordingly, when the water enters the case 300 through the opening 312 of the case 300, the first drain passage 321 is able to discharge the water and restrict the water from being accumulated to the lowest position LP in the movement track TR of the root of the pedal 420. Therefore, the adverse effect such as the deterioration in the operational feeling due to the water resistance to the operation of the pedal 420 or the generation of the abnormal noise can be reduced.

As shown in FIG. 9B, an inner surface 325 of the rear wall 320 in the case 300 may include an inclination which inclines downward. In other words, at least a part of members which forms the first drain passage 321 may include a downward inclination which inclines downward toward the first drain passage 321. As the first drain passage 321 is formed by the member which includes the downward inclination, the water can be guided to flow to the first drain passage 321 by the downward inclination and be easily discharged to the outside.

Figure 10A:
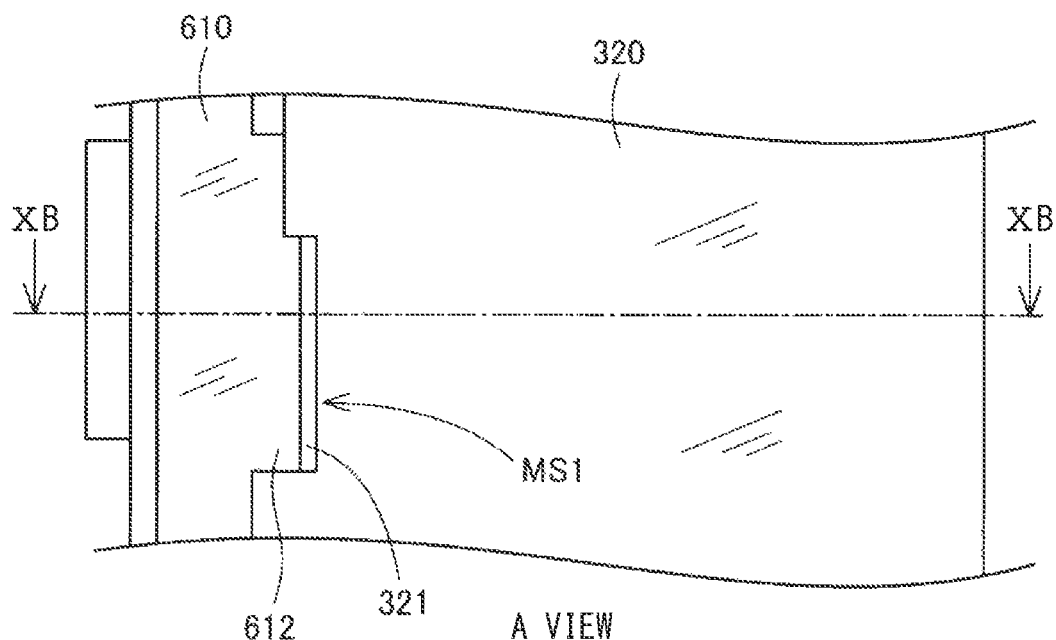
FIG. 10A shows a second structural example of the first drain passage viewed along the arrow A in FIG. 1.
Figure 10B:
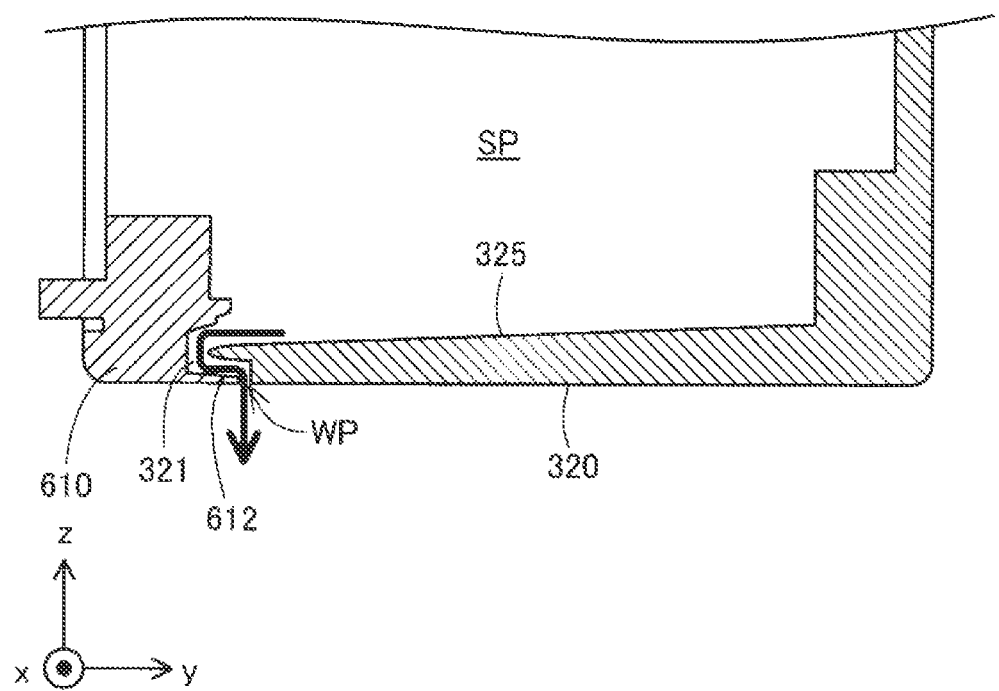
FIG. 10B is a cross sectional view taken along a line XB-XB in FIG. 10A.

FIGS. 10A and 10B show a second structural example of the first drain passage 321. The second structural example is same as the first structural example shown in FIGS. 9A and 9B except for a point which will be described below.
(1) A protrusion 612 is provided on an end of the first cover 610 and protrudes in the y-axis direction.

In the second structural example, the first drain passage 321 is formed by the first combined portion MS1 between the protrusion 612 of the first cover 610 and the case 300. The second structural example produces the same effect as the first structural example described above.

Figure 11A:
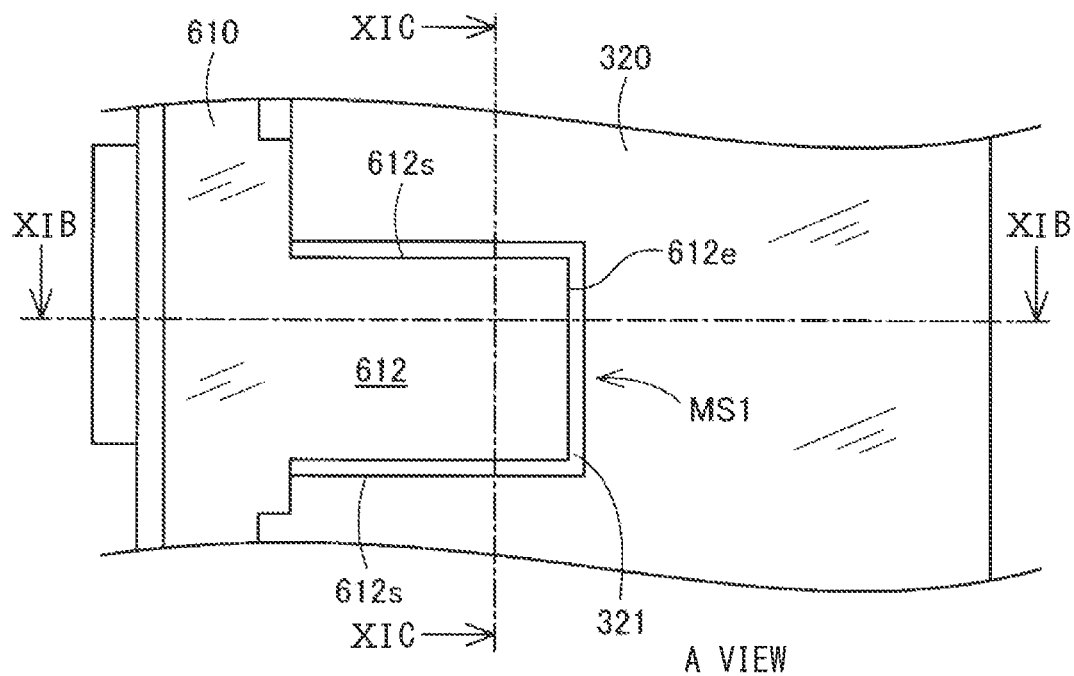
FIG. 11A shows a third structural example of the first drain passage viewed along the arrow A in FIG. 1.
Figure 11B:
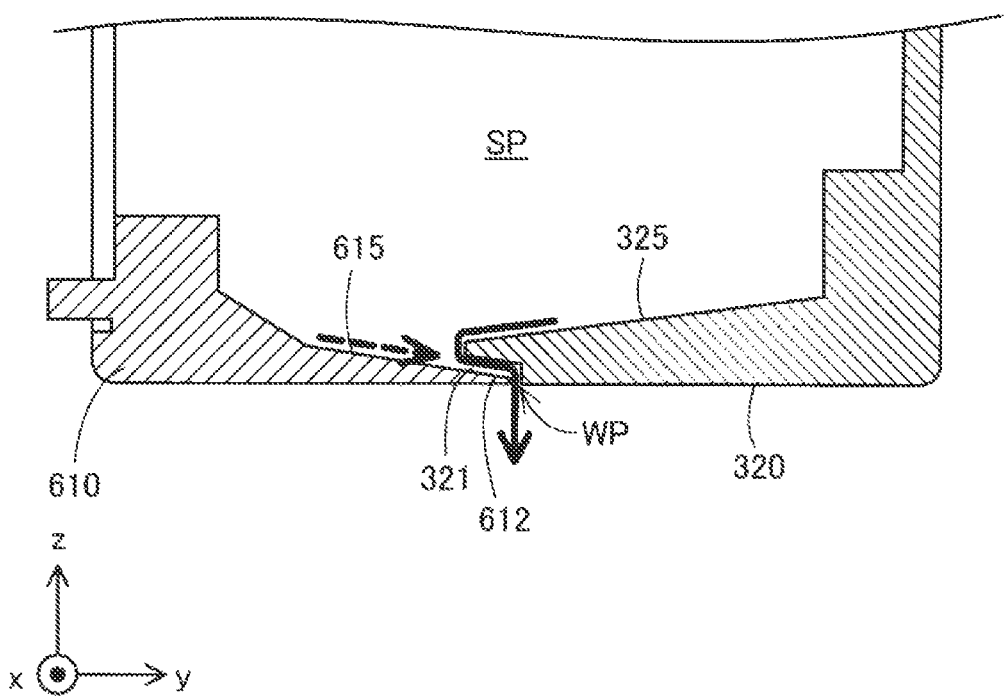
FIG. 11B is a cross sectional view taken along a line XIB-XIB in FIG. 11A.

FIGS. 11A and 11B show a third structural example of the first drain passage 321. The third structural example is same as the second structural example shown in FIGS. 10A and 10B except for two points which will be described below.
(1) The protrusion 612 of the first cover 610 further extends in the y-axis direction than that in the second structural example.
(2) The first drain passage 321 is formed along two lateral sides 612s of the protrusion 612, also in addition to along an end side 612e of the protrusion 612 of the first cover 610.

Figure 11C:
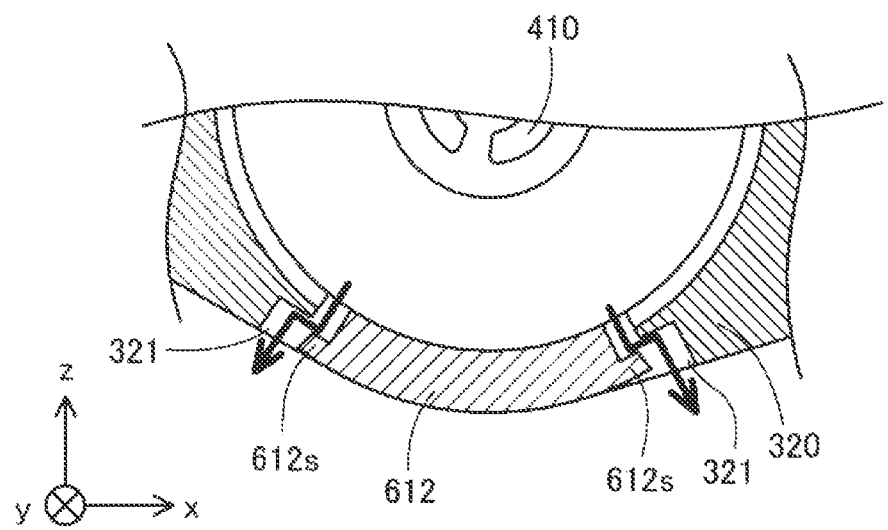
FIG. 11C is a cross sectional view taken along a line XIC-XIC in FIG. 11A.

In the third structural example, as shown in FIG. 11C, the first drain passage 321 is formed by a combined portion of the lateral side 612s of the protrusion 612 in the first cover 610 and the case 300. The third structural example produces the same effect as the first structural example described above. Additionally, in the third structural example, an opening area of the first drain passage 321 is larger than those in the first structural example and the second structural example. Therefore, water can be more reliably discharged.

Figure 12A:
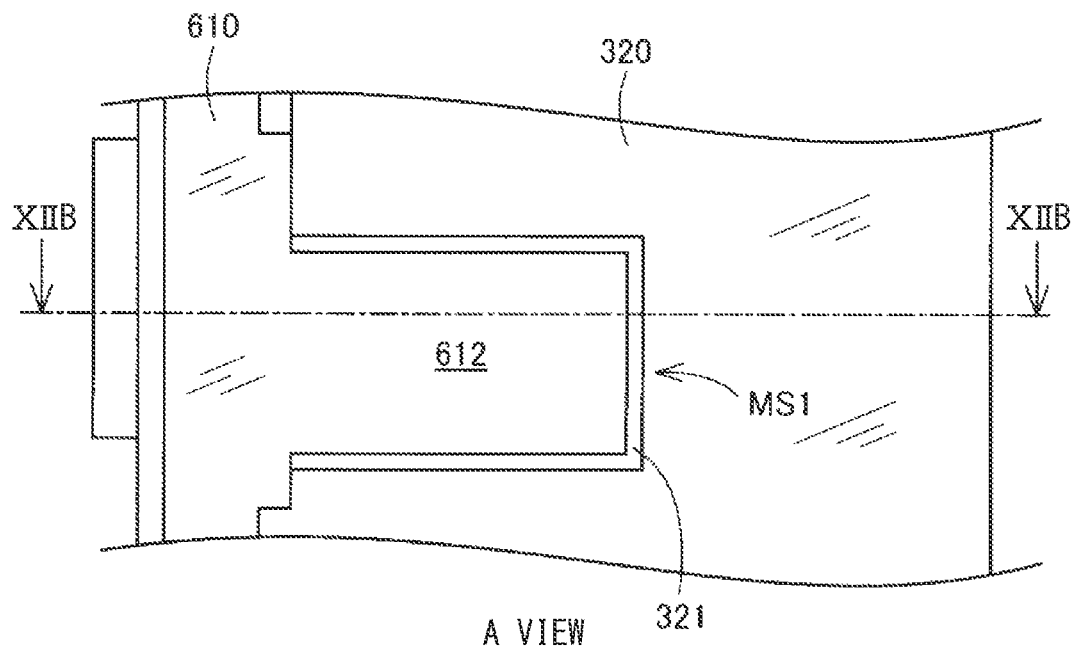
FIG. 12A shows a fourth structural example of the first drain passage viewed along the arrow A in FIG. 1.
Figure 12B:
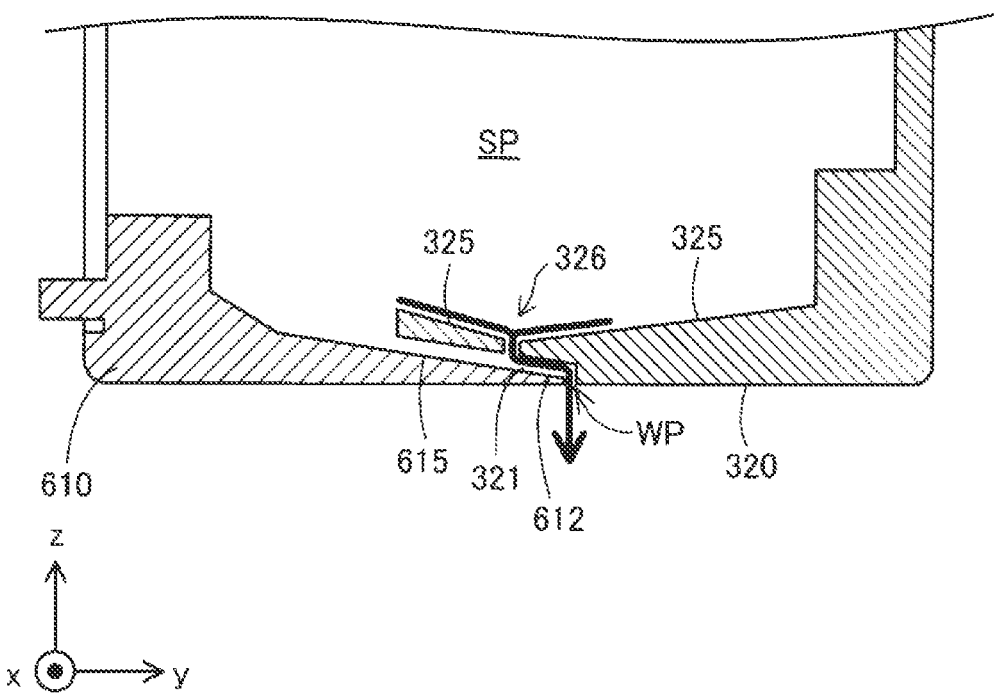
FIG. 12B is a cross sectional view taken along a line XIIB-XIIB in FIG. 12A.

FIGS. 12A and 12B show a fourth structural example of the first drain passage 321. The fourth structural example is same as the third structural example shown in FIGS. 11A and 11B except for four points which will be described below.
(1) The protrusion 612 of the first cover 610 further extends in the y-axis direction than that in the second structural example.
(2) A through hole 326 is formed in the rear wall 320 of the case 300 and is positioned above the protrusion 612 of the first cover 610.
(3) The inner surface 325 of the rear wall 320 in the case 300 includes the downward inclination which inclines downward toward the through hole 326.
(4) An inner surface 615 of the protrusion 612 of the first cover 610 includes the downward inclination which inclines downward.

When a structure includes at least one of (3) and (4), at least a part of the members that form the first drain passage 321 is downward inclined toward the first drain passage 321.

The fourth structural example produces the same effect as the third structural example described above. Additionally, in the fourth structural example, resistance of the first drain passage 321 is smaller than those in the first to third structural examples. Therefore, water can be more reliably discharged.

As described above, the first drain passage 321 is formed by the first combined portion MS1 between the case 300 and the first cover 610 and connects the inside of the case 300 to the outside of the case 300. Because of this, when the water enters the case 300 through the opening 312 of the case 300, the first drain passage 321 is able to discharge the water and restrict the water from being accumulated to the movement track TR of the root of the pedal 420 moved by pressing the pad 200. Therefore, the adverse effect such as the deterioration in the operational feeling due to the water resistance to the operation of the pedal 420 or the generation of the abnormal noise can be reduced.

Figure 13A:
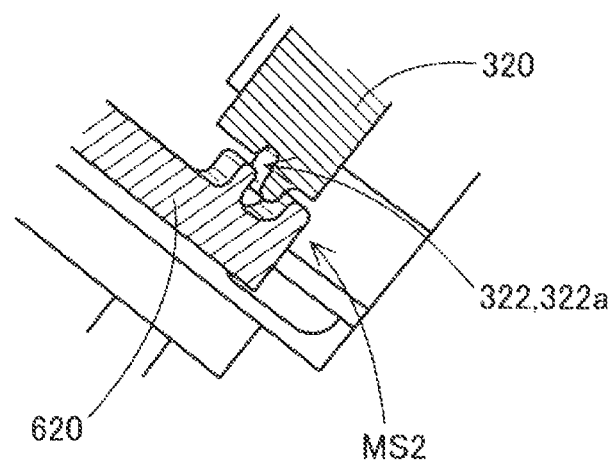
FIG. 13A is an enlarged perspective view showing an area XIIIA in FIG. 5 and shows a structural example of a second drain passage.

C. Structural Example of Second Drain Passage:

FIG. 13A shows an area XIIIA in FIG. 5. As shown in FIG. 13A, a second drain passage 322 is formed by a second combined portion MS2 in which the case 300 and the second cover 620 are overlapped with each other through a gap. The second drain passage 322 connects the inside of the case 300 to the outside of the case 300. The water is discharged to the outside of the case 300 through the second drain passage 322, similarly to the first drain passage 321. In addition, the second drain passage 322 has the labyrinth structure such that the inside of the case 300 is not directly visible from the outside of the case 300 through the second drain passage 322. More specifically, each of the second cover 620 and the rear wall 320 of the case 300 protrudes or is recessed so as to bend the second drain passage 322 in the second combined portion MS2. A recessed portion of the second cover 620 is opposed to a protrusion of the rear wall 320 through the gap, or a recessed portion of the rear wall 320 is opposed to a protrusion of the second cover 620 through the gap.

Similarly to the first drain passage 321 described with referent to FIG. 8, the second drain passage 322 is provided below the lowest position LP in the movement track TR of the root of the pedal 420. Accordingly, when the water enters the case 300 through the opening 312 of the case 300, the second drain passage 322 is able to discharge the water so as to restrict the water from being accumulated to the lowest position LP in the movement track TR of the root of the pedal 420. Therefore, the adverse effect such as the deterioration in the operational feeling due to the water resistance to the operation of the pedal 420 or the generation of the abnormal noise can be reduced.

Figure 13B:
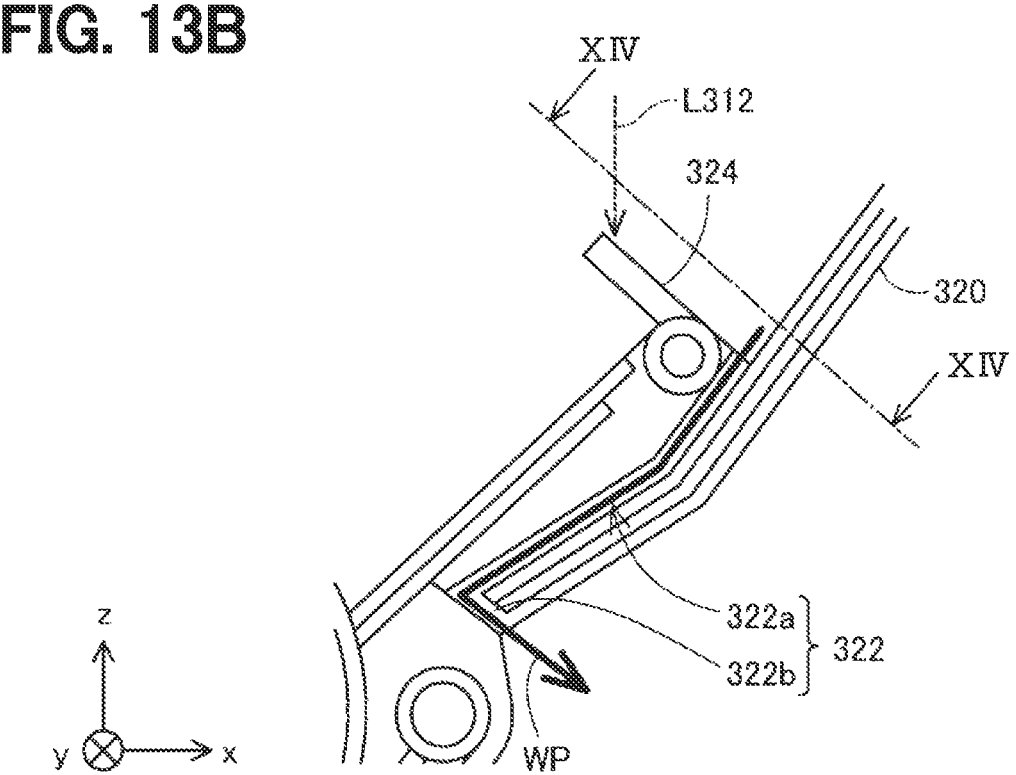
FIG. 13B is an enlarged view showing an area XIIIB in FIG. 2 and shows the structural example of the second drain passage.

FIG. 13B shows an enlarged view of an area XIIIB in FIG. 2. As shown in FIG. 13B, the second drain passage 322 includes a conduit 322a and a discharge port 322b. The conduit 322a guides the water to flow downward. The water is discharged from a bottom of the conduit 322a to the outside of the case 300 through the discharge port 322b. FIG. 13A shows the conduit 322a in the second drain passage 322. The water WP can be discharged from the inside of the case 300 to the outside of the case 300 through the second drain passage 322.

The second drain passage 322 may have a shape other than that shown in FIG. 13A or 13B. For example, the second drain passage 322 may have a structure similar to the structure of the first drain passage 321 described above. In addition, in the present embodiment, the two drain passages 321, 322 are provided. However, only one of the two drain passages 321, 322 may be provided. In addition, the drain passage may not be formed by the combined portion of the case 300 and the cover 600. For example, the drain passage may be formed by a through hole in the case 300 or the cover 600. However, when the drain passage is formed by the combined portion of the case 300 and the cover 600, the drain passage can be formed easily, and in particular, the labyrinth structure can be easily structured.

D. Other Structural Examples:

FIG. 13B shows a position of the screen 324 formed in a plate shape. The screen 324 is arranged on the inner surface of the rear wall 320 in the case 300. As described in FIG. 2, the screen 324 is configured to guide the water to flow in the route avoiding the bias member 430. That is, when the water enters the case 300 from the opening 312 and falls in the vertical direction, the screen 324 restricts the water from being directly reaching the bias member 430. Therefore, the screen 324 may extend obliquely upward above a position on which the screen 324 intersects with a vertical straight line L312 extending vertically downward from a lower end of the opening 312 of the front wall 310. Additionally, the screen 324 may be arranged above the second drain passage 322. In this case, when the water enters the case 300 from the opening 312 and falls in the vertical direction, the bias member 430 is protected from the water directly reaching the bias member 430. Additionally, the screen 324 guides the water to flow toward the second drain passage 322. In case where the bias member 430 is made of metal, the bias member 430 is easily deteriorated if the water adheres to the bias member 430. By providing the screen 324, the bias member 430 can be protected from the deterioration.

Figure 14A:
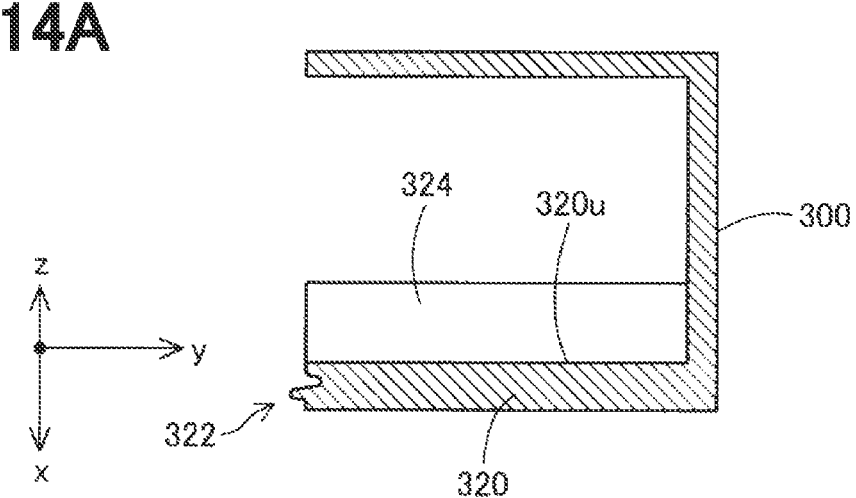
FIG. 14A is a first structural example of a cross sectional view taken along a line XIV-XIV in FIG. 13B.
Figure 14B:
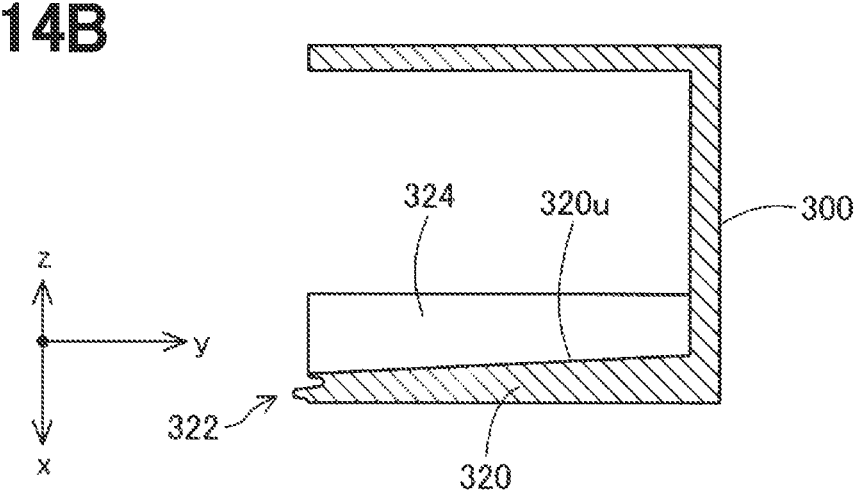
FIG. 14B is a second structural example of the cross sectional view taken along the line XIV-XIV in FIG. 13B.

FIGS. 14A and 14B show cross sectional views taken along a line XIV-XIV in FIG. 13B. As shown in FIGS. 14A and 14B, the screen 324 stands on an inner surface 320u of the rear wall 320 in the case 300. The inner surface 320u corresponds to a root of the screen 324. The inner surface 320u may not incline in the y-axis direction which is the width direction of the vehicle as shown in FIG. 14A. However, the inner surface 320u may incline in the y-axis direction as shown in FIG. 14B. That is, the root of the screen 324 may include a downward inclination which inclines downward toward the second drain passage 322. In this case, the water which enters the case 300 can be guided to flow to the second drain passage 322 by the downward inclination and can be easily discharged.

Instead of the screen 324 formed in a plate shape, a step may be provided on the rear wall 320. The step may extend obliquely upward above a position on which the step intersects with the vertical straight line L312 extending vertically downward from the lower end of the opening 312 of the case 300. The step described above can produce the effect similar to the screen 324.

Figure 15:
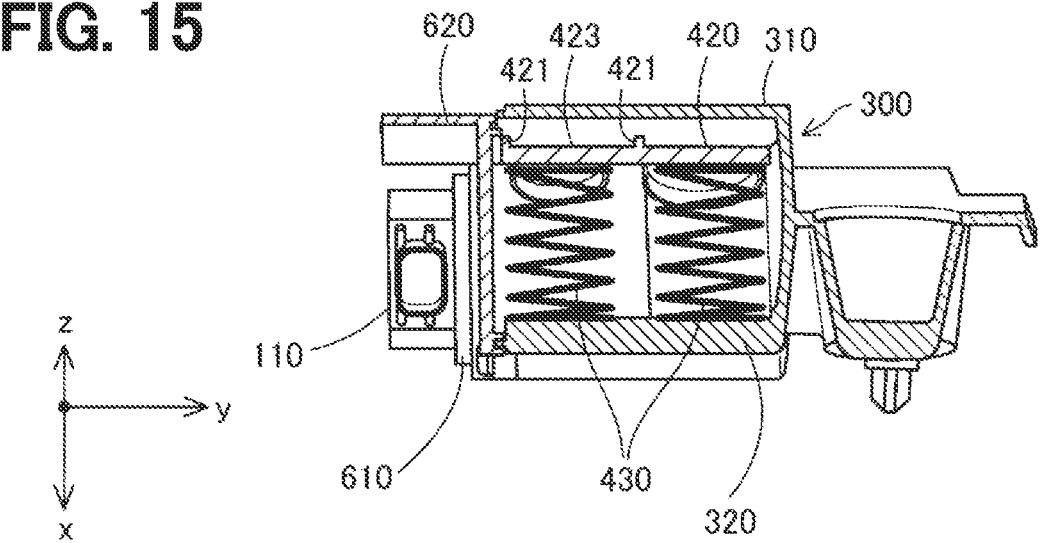
FIG. 15 shows another example of the pedal having a structure different from that in FIG. 5.

As shown in FIG. 15, the pedal 420 may include a groove 423 on an upper surface opposed to the front wall 310 of the case 300. The groove 423 extends in an up-down direction. The groove 423 is formed between two protrusions 421. The protrusions 421 may be arranged on ends of the upper surface of the pedal 420. In this configuration, the water which enters through the opening 312 is guided to flow downward along the groove 423 on the upper surface of the pedal 420 and easily flows toward the drain passage. Therefore, the water is not easily accumulated inside and can be discharged to the outside.

The present disclosure should not be limited to the embodiments described above, and various other embodiments may be implemented without departing from the scope of the present disclosure. For example, in order to solve some or all of issues in the present disclosure, or to achieve some or all effects in the present disclosure, the technical features in the embodiments can be replaced or combined as appropriate. In addition, if the technical feature is not described as essential in the present specification, the technical feature may be omitted as appropriate.

What is claimed is:

1. An accelerator device having an organ structure comprising:
   a pad configured to be pressed by a driver;
   a case that is configured to be attached to a vehicle body and includes
      a front wall facing the pad,
      a rear wall opposed to the front wall, and
      an opened side located so as to form one of side surfaces of a space between the front wall and the rear wall;

an inside movable mechanism housed in the case and that includes
a shaft supported by the case and configured to rotate,
a pedal that extends obliquely upward from an outer peripheral surface of the shaft, and
a bias member arranged below the pedal and configured to bias the pedal toward an accelerator idle state;
an arm that penetrates an opening provided in the front wall of the case so as to connect the pad to the pedal; and
a cover that covers the opened side, wherein
the case provided on the vehicle body includes at least one drain passage positioned below a lowest position of a root of the pedal in a movement track while the pedal is moved from the accelerator idle state to an accelerator full-throttle state,
the at least one drain passage is formed by a clearance between the case and the cover,
the cover includes:
a first cover that covers a lower portion of the opened side corresponding to a side of the shaft; and
a second cover that covers an upper portion of the opened side above the first cover, and
the at least one drain passage includes a drain passage formed by a clearance between the case and the second cover.

2. The accelerator device according to claim 1, wherein the at least one drain passage further includes another drain passage formed by a first combined portion of the case and the first cover.

3. The accelerator device according to claim 2, wherein the at least one drain passage includes both of the drain passage and the another drain passage.

4. The accelerator device according to claim 1, wherein at least a part of a member that forms the at least one drain passage inclines downward toward the drain passage.

5. The accelerator device according to claim 1, wherein the clearance forms a labyrinth structure within a thickness of the case.

6. The accelerator device according to claim 1, wherein the at least one drain passage includes another drain passage formed by a clearance between the case and the first cover.

7. An accelerator device having an organ structure comprising:
a pad configured to be pressed by a driver;
a case that is configured to be attached to a vehicle body and includes
a front wall facing the pad,
a rear wall opposed to the front wall, and
an opened side located so as to form one of side surfaces of a space between the front wall and the rear wall;
an inside movable mechanism housed in the case and that includes
a shaft supported by the case and configured to rotate,
a pedal that extends obliquely upward from an outer peripheral surface of the shaft, and
a bias member arranged below the pedal and configured to bias the pedal toward an accelerator idle state;
an arm that penetrates an opening provided in the front wall of the case so as to connect the pad to the pedal; and
a cover that covers the opened side, wherein
the case provided on the vehicle body includes at least one drain passage positioned below a lowest position of a root of the pedal in a movement track while the pedal is moved from the accelerator idle state to an accelerator full-throttle state,
the case includes a step or screen arranged above the at least one drain passage on an inner surface of the rear wall, and
the step or screen extends obliquely upward above a position at which the step or screen intersects with a virtual straight line extending vertically downward from a lower end of the opening of the front wall.

8. The accelerator device according to claim 7, wherein a root of the step or screen is downward inclined toward the second drain passage.

9. The accelerator device according to claim 7, wherein the second drain passage includes:
a conduit configured to guide water to descend from the root of the step or screen along an edge of the opened side; and
a discharge port through which the water is discharged from a lower end of the conduit to an outside of the case.

10. The accelerator device according to claim 7, wherein the at least one drain passage is formed by a clearance between the case and the cover.

11. The accelerator device according to claim 10, wherein the clearance forms a labyrinth structure within a thickness of the case.

12. An accelerator device having an organ structure comprising:
a pad configured to be pressed by a driver;
a case that is configured to be attached to a vehicle body and includes
a front wall facing the pad,
a rear wall opposed to the front wall, and
an opened side located so as to form one of side surfaces of a space between the front wall and the rear wall;
an inside movable mechanism housed in the case and that includes
a shaft supported by the case and configured to rotate,
a pedal that extends obliquely upward from an outer peripheral surface of the shaft, and
a bias member arranged below the pedal and configured to bias the pedal toward an accelerator idle state;
an arm that penetrates an opening provided in the front wall of the case so as to connect the pad to the pedal; and
a cover that covers the opened side, wherein
the case provided on the vehicle body includes at least one drain passage positioned below a lowest position of a root of the pedal in a movement track while the pedal is moved from the accelerator idle state to an accelerator full-throttle state, and
the at least one drain passage is bent to have a labyrinth structure within a thickness of the case so that an inside of the case is invisible from an outside of the case.

13. The accelerator device according to claim 12, wherein the labyrinth structure causes the at least one drain passage to be angled within the thickness of the case.

14. The accelerator device according to claim 12, wherein the labyrinth structure has a recess formed on one of the cover and the case, and the other of the cover and the case has a protrusion opposing to the recess.

15. The accelerator device according to claim 12, wherein the labyrinth structure has a recess formed on one of the cover and the case, and the other of the cover and the case is inserted into the recess.

16. The accelerator device according to claim 12, wherein the labyrinth structure causes the at least one drain passage to extend in a first direction and a second direction opposite from each other.

17. An accelerator device having an organ structure comprising:
 a pad configured to be pressed by a driver;
 a case that is configured to be attached to a vehicle body and includes
  a front wall facing the pad,
  a rear wall opposed to the front wall, and
  an opened side located so as to form one of side surfaces of a space between the front wall and the rear wall;
 an inside movable mechanism housed in the case and that includes
  a shaft supported by the case and configured to rotate,
  a pedal that extends obliquely upward from an outer peripheral surface of the shaft, and
  a bias member arranged below the pedal and configured to bias the pedal toward an accelerator idle state;
 an arm that penetrates an opening provided in the front wall of the case so as to connect the pad to the pedal; and
 a cover that covers the opened side, wherein
 the case provided on the vehicle body includes at least one drain passage positioned below a lowest position of a root of the pedal in a movement track while the pedal is moved from the accelerator idle state to an accelerator full-throttle state, and
 the pedal includes a groove on an upper surface opposed to the front wall of the case, and the groove extends in an up-down direction.

\* \* \* \* \*